United States Patent [19]

Lennartz et al.

[11] Patent Number: 4,518,501

[45] Date of Patent: May 21, 1985

[54] FLUSH-BACK FILTER

[75] Inventors: Rüdiger Lennartz, Pulheim; Willi Rott, Bornheim; Heinz Sindorf, Rommerskirchen, all of Fed. Rep. of Germany

[73] Assignee: Firma Boll & Kirch, Filterbau GmbH, Kerpen, Fed. Rep. of Germany

[21] Appl. No.: 530,725

[22] Filed: Sep. 9, 1983

[30] Foreign Application Priority Data

Sep. 25, 1982 [DE] Fed. Rep. of Germany ....... 3235552

[51] Int. Cl.³ .............................................. B01D 35/16
[52] U.S. Cl. .................................... 210/411; 210/437; 210/413
[58] Field of Search ................ 210/393, 437, 411, 413

[56] References Cited

U.S. PATENT DOCUMENTS 4,194,975  3/1980  Baker .................................. 210/411

FOREIGN PATENT DOCUMENTS 1436267  8/1970  Fed. Rep. of Germany .
2327532 12/1974  Fed. Rep. of Germany .
 413677  7/1934  United Kingdom .
2074885 11/1981  United Kingdom .

Primary Examiner—Andres Kashnikow
Assistant Examiner—Scott D. Malpede
Attorney, Agent, or Firm—Body, Vickers & Daniels

[57] ABSTRACT

The flush-back filter according to the invention uses as supporting element for at least one filter element a support cage which is arranged firmly on the inside of the filter housing and is penetrated from the interior to the exterior by the medium to be filtered. At the interior of the support cage a lifting or rotating flush-back device is located which upon its movement passes over the slot-type windows of the support cage in succession. The slot-type windows are arranged on the support cage in several groups in such a way that the windows of the one group are offset against those of the other group(s) in the direction of movement of the flush-back device, in such a way that the windows of the one group lie at least with the webs of another group on a common plane. In this way the entire filter area is subjected to the flush-back operation during this operation only over very small surface areas, with the result that small flush-back volumes can be used and the pressure drop is slight.

18 Claims, 4 Drawing Figures

FLUSH-BACK FILTER

BACKGROUND OF THE INVENTION

The invention relates to a flush-back filter for liquid media, in particular for liquid fuels, having a filter inlet, a filter outlet and a filter housing with a sludge drain, a support cage penetrated from the interior to the exterior by the medium to be filtered firmly fixed in the filter housing for a least one filter element arranged at its exterior, having at least two groups of slot-type windows arranged on the support cage, whereby the windows within each group run in parallel to one another and are separated from one another by parallel narrow webs of the support cage and having a flush-back device on the inside of the support cage movable by means of an actuator or drive and draining off the filter residues to the sludge drain, said flush-back device overlapping upon its movement the windows of the support cage with a slit aperture or the like in succession and thereby progressively clearing the filter area during filter operation using the differential pressure between the filter outlet and the sludge drain.

Flush-back filters of this type, used preferably in fuel systems for drives such as in particular ship engines are known from the DE-PS No. 14 36 267. The cylindrical support cage used here has slot-type windows closely running in parallel to each other which extend respectively over an arcuate circumference of approx. 80° to 85° and which are separated from each other by narrow arcuate webs. Four window groups in all are provided over the cylindrical circumference of the support cage which comprise in each case a plurality of windows vertically one over the other. With the upward stroke of the plate-like slide valve, which is actuated with the help of a pressure loaded movable piston, in each case four windows on a common radial plane of the support cage are overlapped simultaneously by a peripheral groove arranged at the periphery of the slide valve with the result that the filter is cleaned over a partial area by the flush-back filtrate and is freed from all adhering impurities, said filter extending essentially over the entire scope of the support cage. Backflushing over the relatively large partial areas requires appropriately large flushing volumes and leads furthermore to a relatively large pressure drop on the discharge side of the filter and so, too, within the system.

With the known flush-back filters the backflushing operation occurs furthermore only upon upstroke of the slide valve. At the beginning of the downstroke of the slide valve the connection to the sludge outlet is automatically cut off by means of a closing or plugging member which is arranged on an adjustable rod bearing the slide valve with no-load stroke, penetrating the support cage, said adjustable rod supporting the adjustable piston guided at its upper end in a cylinder.

From the DE-AS No. 23 27 532 a flush-back filter is also known whereby the cleaning of the cylindrical filter jacket is effected with the help of several cleaning nozzles distributed over the height of the filter insert which are rotatably arranged in the filter insert and operate alternately. These cleaning jets in the form of air jets can be opened respectively via an own sludge drain to the free atmosphere, whereby the reverse flow of cleaned fluid is effected through the filter jacket and the respective opened cleaning nozzle. Thereby the cleaning device is controlled in such a way that during one cleaning cycle respectively only one single cleaning nozzle is opened to the pressureless sludge drain. In this way the filter jacket can be successfully cleaned over relatively small partial areas and with correspondingly lower flush-back volumes at a decreased pressure drop in the system. However, the constructional expenditure for the drive and control of the various cleaning nozzles is considerable here.

SUMMARY OF THE INVENTION

The task of the invention is to design a flush-back filter of the initially named type with as simple a construction as possible so that the cleaning process can be carried out with small flush-back volumes and slight pressure drop at the filter outlet without complicated and costly control devices for control of the cleaning device.

This task is solved according to the invention by the special design of the support cage. According to the invention the slot-type windows of the one group are offset on the support cage against those of the other group(s) in the stroke direction of the flush-back device in such a way that the windows of the one group lie on a common plane with the webs of the other group(s).

With the embodiment of the support cage according to the invention it is therefore achieved that at any time only a very small surface zone of the filter area in relation to the overall filter area is subjected to the backflushing and cleaning process by the flush-back device closely guided in the support cage with the result that it is possible to work with extremely small backflushing volumes and the pressure drop on the filter outlet side and so, too, the drop within the system pressure is only correspondingly slight. This advantageous effect can be achieved in the case of the flush-back filters as known from the DE-PS No. 14 36 267, basically solely due to the named design of the support cage and the staggered arrangement of its slot-type windows. It can, however, also be achieved to the same extent with a flush-back filter, whereby the flush-back device consists of a flushing arm rotatable about the axis of the support cage, without, as known from the DE-AS No. 23, 27 532, several separately controllable cleaning jets having to be provided.

The invention can be realized to special advantage in the case of a flush-back filter, which, as known from the DE-PS No. 14 36 267 has a support cage supporting the filter tissue or the like at its exterior, whereby the slot-type windows and the webs extend in circumferential direction of the cylindrical support cage and each window group comprises a plurality of parallel windows offset or staggered in the direction of the longitudinal axis of the support cage and extending all over the same partial circumference of the support cage, whereby the flush-back device consists of a slide valve or the like guided closely to the arcuate webs with stroke movable in axial direction of the support cage, which slide valve has at its external periphery a slit aperture running in the circumferential direction, which is connected or connectable with the sludge drain via a tubular lifting rod or the like raisable together with the slide valve. With a flush-back filter of this construction type the support cage according to the invention is expediently formed in such a way that the windows of the one group are offset in relation to the windows of the adjacent group circumferential to the support cage, in axial direction of the support cage so that the windows of the first named group and the webs of the second named group lie respectively on a common radial planes of the support cage. In order to be able to accommodate a large number of slot-type windows on the support cage with a sufficiently large own stability of the support cage preferably consisting of a casting, the provision of four window groups offset at respectively 90° against one another over the circumference of the support cage is recommended, the windows whereof extending respectively over an arcuate circumference of about 75° to 85°, so that the longitudinal webs are formed between the four window groups in axial direction of the support cage. Hereby the arrangement is advantageously made in such a way that respectively the windows of the two diametrally opposed window groups on the support cage are located on a joint or common diametral plane. With the previously named design of the support cage, if the flush-back filter is equipped with a flush-back device of the type known from DE-PS No. 14 36 267, maximum two windows in each case are passed over by the slide valve at any time with the result that a halving of the surface zone subjected to the flush-back process is achieved in each case with the corresponding reduction in the flush-back volume and corresponding reduced pressure drop at the filter outlet.

The aforenamed arrangement can be improved even more in the further embodiment of the invention in accordance with the object thereof if a slide valve acting as flushing plate is used, which has at least two flush-back ducts offset against each other and closed to each other in the circumferential direction which are respectively connected at the slide valve circumference with an arcuate slit aperture and which respectively are connected with the sludge drain via an own discharge duct shut off by a closing member dependent on the direction of movement of the slide valve, whereby upon upstroke of the slide valve the one discharge duct is closed by the associated closing member and the other discharge duct opened by its plugging member whereas upon downstroke of the slide valve the reverse occurs, namely the first-named discharge duct is opened and the second-named discharge duct is closed. With this arrangement therefore at all times maximum one slot-type window is intersected by the slide valve and connected with the atmospheric pressure in the sludge drain with the result that a correspondingly reduced surface zone of the filter is subjected to the flush-back procedure. The flush-back operation is hereby carried out in both stroke directions of the slide valve. A structurally particularly simple and reliable arrangement is produced of the named discharge ducts consist of radial bores of the tubular lifting mechanism and the closing members are formed by slide valve surfaces firmly attached to or arranged on the slide valve overlapping the radial bores in the shut-off position, and if furthermore the slide valve is axially limitedly movable for alternate opening and closing of the radial bores in relation to the tubular lifting mechanism.

As known in itself the tubular lifting rod or the like which produces the connection to the sludge drain can have a rod extension which penetrates the support cage, said extension holding above the support cage a piston guided in a cylinder forming the actuator or drive, said piston being optionally impacted by a hydraulic or pneumatic pressure medium over its one or other piston surface. Furthermore it is recommended to arrange a closing member sealing off the sludge drain at the lower end of the lifting rod which at the beginning of the upstroke of the slide valve is raised from its seat and so produces the connection to the sludge drain.

If the flush-back device consists of a flushing arm or the like rotatable within the cylindrical support cage, which is provided with an axial slit aperture and is connected or connectable to the sludge drain, a support cage is preferably used which has at least two window groups with slot-type windows spread respectively over the circumference of the support cage extending in the axial direction of the support cage and separated by axial webs, whereby the windows of the one group are in each case on a joint axial plane with the webs of the other group. The slit aperture of the flushing arm closely positioned against the cylindrical inner surface of the support cage can hereby essentially extend over the entire filter effective length of the support cage. Also in this case it is ensured that respectively only one single window is passed over by the flushing arm. The flushing arm is expediently arranged on a hollow shaft, via which the connection to the sludge drain is produced.

Further advantageous structural embodiment features are indicated in the individual sub-claims and are subsequently more closely explained in connection with the embodiment examples shown in the drawing.

DESCRIPTION OF PREFERRED EMBODIMENTS

Figure 1:
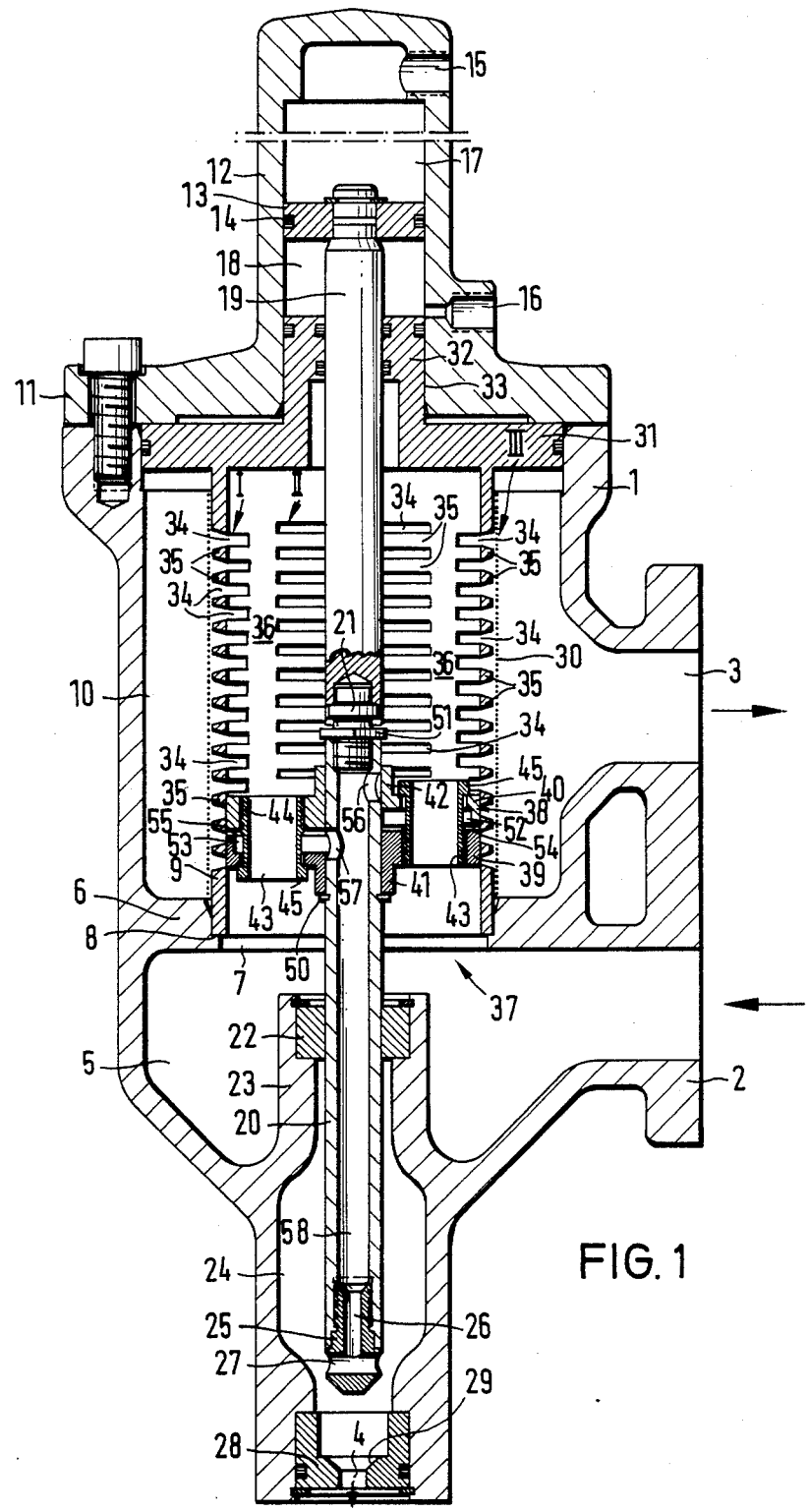
FIG. 1 a vertical section of a flush-back filter according to the invention.
Figure 2:
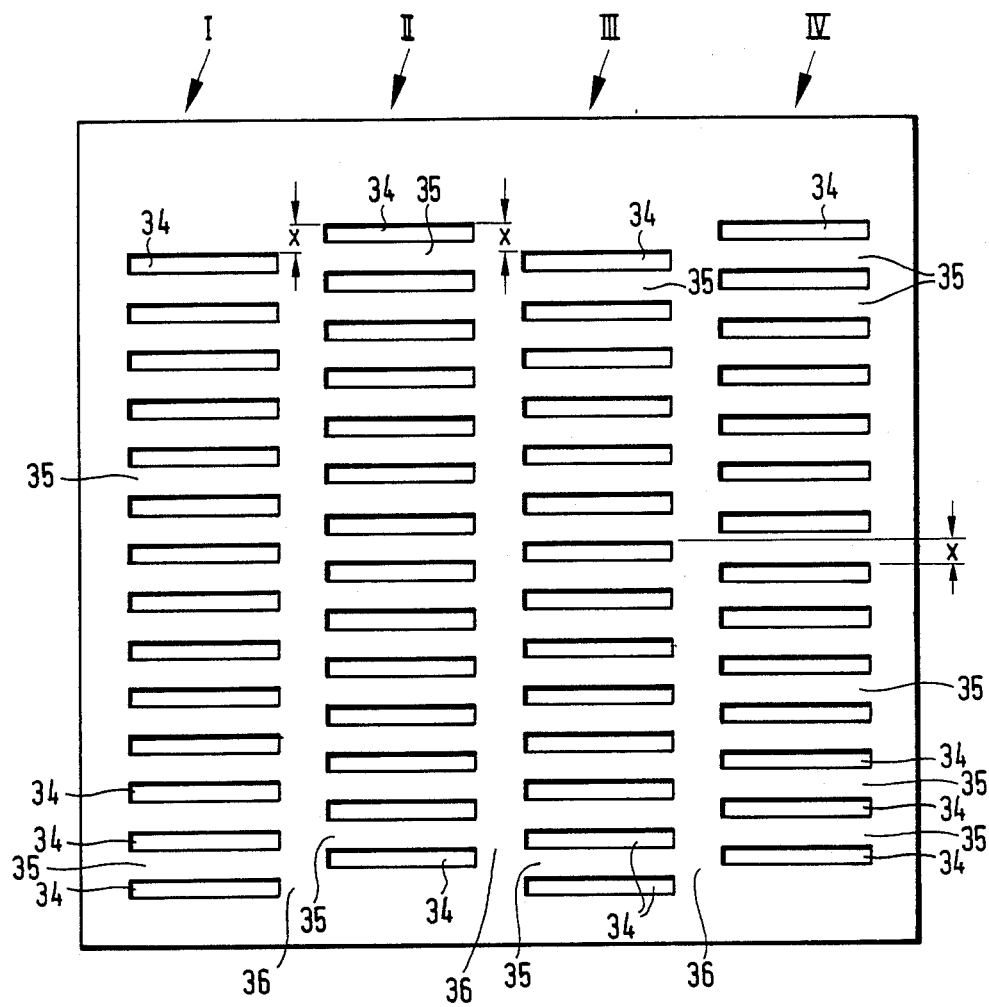
FIG. 2 in a development the sheathing or jacket of the support cage provided in the case of the flush-back device according to FIG. 1
Figure 3:
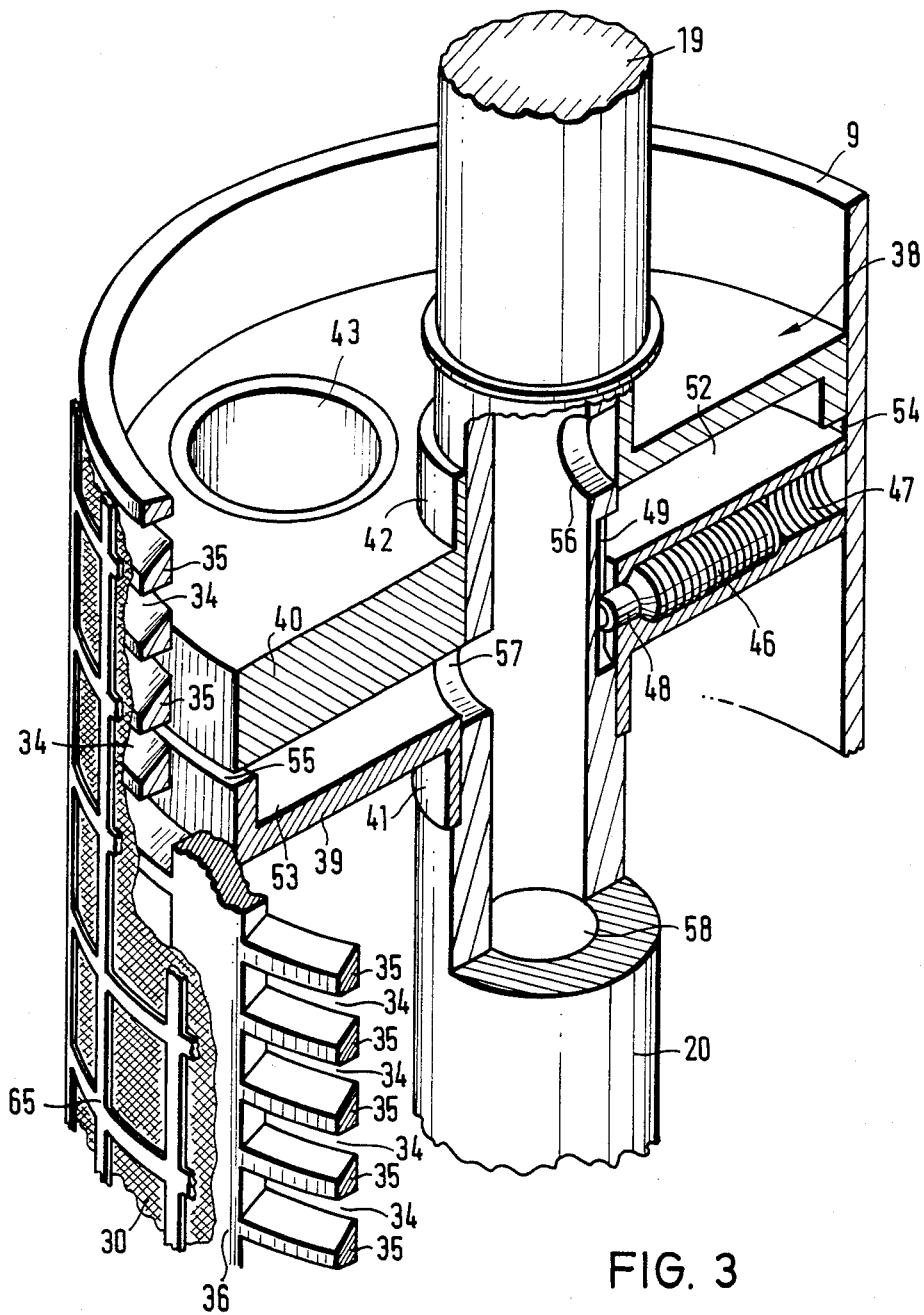
FIG. 3 in a perspective partial sectional diagram the support cage with the plate-like slide valve which is used with the flush-back filter according to FIG. 1.

The flush-back filter shown in FIGS. 1 to 3 has a filter housing 1 with a filter inlet 2 arranged at its circumference and thereabove a filter outlet 3 as well as a sludge drain 4 at the underside of the housing. The filter inlet 2 leads into a base chamber 5 which lies below a transverse wall 6 of the filter housing 1 and is provided with a stepped mounting opening 7 in which a cylindrical support cage 9 rests on an annular shoulder 8. The support cage 9 lies on the inside of a filter chamber 10 of the filter housing 1 which is closed at the upper side by a detachable lid or cover 11.

The lid or cover 11 supports an axially protruding cylinder 12, wherein a piston 13 with piston packing 14 is guided. The cylinder 12 with the piston 13 forms an actuator or drive for the flush-back device described in more detail further below. The cylinder 12 has two connections 15 and 16, via which optionally a hydraulic or pneumatic pressure medium can be introduced into the cylinder chamber 17 located above the piston 13 or into the annular cylinder chamber 18 located below the piston 14. The piston 13 is firmly mounted on a piston rod 19, which penetrates the support cage 9 concentrically and forms a rod extension of a tubular lifting rod 20. The rod extension is preferably slightly articulated via a rod coupling 21 connected with the tubular lifting rod 20 the tubular lifting rod 20 engages with sliding seal a slip ring 22, which is held in a recess of a collar member 23 of the filter housing 4 protruding concentrically into the lower chamber 5. The lifting rod 20 immerses into a sludge chamber 24 of the filter housing which is provided with the sludge drain 4. At its lower end the lifting rod 20 bears a closing or plugging member 25, which shuts off the sludge drain 4 when no backflush is being carried out. The closing member 25 has an axial bore 26 and a radial bore 27 which form the link to the sludge chamber 24. At the sludge drain on the underside of the filter housing 1 an insert 28 is arranged which is provided with a conical valve seat 29 for the plugging member 25.

The cylindrical support cage 9 bears at its exterior at least one filter element, e.g. a filter jacket, a filter mesh or a filter tissue 30. Instead of a cylindrical filter jacket or filter tissue a star-shaped filter known in itself can be provided to increase the filter area. For this purpose, too, known star-formed filter disks can be used which enclose the support cage 9 spaced out at intervals over each other and respectively lie between a double sheathing in radial planes arranged over one another. The formation of the screen resp. filter element 30 is of subordinate significance to the invention.

The support cage 9 is preferably established as one-piece casting. It has a head plate 31 which engages closely with an axial lug 32 into a cylindrical port 33 of the lid 11, which in its extension forms the cylinder chamber 18 of the cylinder 12. The support cage 9 is accordingly held coaxial to the housing axis in the filter housing 1 between the lid 11 and the web wall of the filter housing 1.

The support cage 9 has over its length enclosed by the filter element 30 a plurality of narrow slot-type windows 34, which run parallel to one another and have in all the same length. The horizontal windows 34 extend respectively over an arcuate length over the circumference of the support cage 9 of approx. 75° to 85°. Between the windows there are arcuate webs 35 which have according to FIG. 1 a somewhat trapezoidal cross-section with the result that the slot-type windows 34 enlarge conically towards the exterior of the support cage 9. The mean width of the arcuate webs 35 is approximately equal to the mean clear width of the windows 34. The webs 35 extending similarly in circumferential direction of the cylindrical support cage pass at their both ends into the longitudinal webs 36 of the support cage sheathing. As in particular the development of the cylindrical jacket of the support cage 9 shows according to FIG. 2 the windows 34 are arranged in such a way that there are four window groups I, II, III and IV over the circumference of the support cage 9 within which the windows 34 lie parallel over one another. The sectional view according to FIG. 1 allows merely three of these window groups I, II, and III to be seen. For example, each group I to IV comprises fourteen windows 34 lying over one another in axial direction of the support cage 9. It is clear that the windows 34 and likewise the webs 35 of both groups I and III are respectively located at one height i.e. in common transverse resp. radial planes of the support cage. The same applies for the windows 34 and the webs 35 of the two other groups II and IV. Thereby, however, the individual windows 34 and webs 35 of both groups II and IV are offset against the windows and webs of the groups I and III by an extent x in axial direction of the support cage. The extent x corresponds approx. to the height of the windows resp. the mean width of the webs 35. The windows of the groups I and III as well as the groups II and IV lie at the circumference of the support cage 9 respectively diametrally opposed. The arrangement is accordingly such that the slot-type windows 34 of the one group I resp. III with the webs 35 of the adjacent group II resp. IV are located in a common radial plane of the support cage.

The flush-back device 37 consists of a cylindrical slide valve 38 in the form of a cleaning plate which is formed from a plate-like lower section 39 and similarly a plate-like upper section 40, which have in each case a central opening for the passage and engaging of the tubular lifting rod 20. Both sections 39 and 40 have an axial flange 41 resp. 42 forming the plate hub, said flange tightly sealing the lifting rod 20. The sections 39 and 40 are linked via four sleeve-like insert parts 43 to form a rigid unit. These insert parts engage bores of the sections 39 and 40 which are arranged on a common graduated circle of these sections at uniform circumferential distances of 90°. Two of the insert parts 43 are screwed with their male screw 44 into the female screw of the bores of the slide valve upper section 40. They support at their lower end a flange 45 which grips under the slide valve lower section 39. The two other insert parts 43 are screw jointed in reverse arrangement with the slide valve lower section 39 whereby their flanges 45 overlap the slide valve upper section 40. Via the four insert parts 43 the link from the base chamber 5 having the filter inlet 2 into the inner area of the support cage 9 in the filter chamber 10 is produced.

The slide valve 38 is located with a certain axial dead motion on the lifting rod 20. According to FIG. 3 this no-load stroke is limited by a stop screw 46 which is screwed into a radial threaded bore of the slide valve lower section 39 and engages with a pivot projection 48 into an axial groove 49 of the lifting mechanism 20. Instead of this stroke limitation with the help of the stop screw 46 according to FIG. 1 a stroke limitation can be implemented by means of two stops 50 and 51 located externally on the lifting rod 20.

The slide valve 38 has flush-back ducts 52 and 53 offset and shut off against each other, which are connected at the slide valve circumference with an arcuate nozzle or slit aperture 54 resp. 55 and which are respectively connected via an own discharge duct 56 resp. 57 shut off by a plugging member with the axial internal channel 58 of the tubular lifting rod 20.

The discharge ducts 56 and 57 are formed by radial bores of the lifting rod 20, which are arranged at staggered levels and offset in circumferential direction at the lifting mechanism 20. Even the flush-back ducts 52 and 53 are offset at different heights against each other on diametrally opposed sides of the lifting rod. The same applies for the narrow slit apertures 54 and 55, which extend respectively approximately over an arcuate circumference of 180°. The flush-back ducts 52 and 53 are formed by surface taperings of the plate-like side valves 39 and 40. The flanges 41 and 42 of the slide valves 39 and 40 form at the same time closing members which close or open the allocated radial bore 56 resp. 57 depending on the stroke position of the slide valve 38. The nozzle type slit aperture 54 and 55 are formed by the circumferential sections arranged at axial distance from one another of both slide valve sections 39 and 40 arranged one above the other. The liquid medium to be filtered flows via the filter inlet 2 into the base chamber 5 and from here via the bores of the inserts 43 into the inner area of the support cage 9. It flows then via the slot-type windows 34 of the support cage 9 via the screen or filter element 30 and arrives finally as filtrate via the filter outlet 3 into the system. Thereby the filtered dirt particles become deposited in the screen resp. filter element 30.

For the performance of the flush-back operation a pressure medium is introduced via the cylinder connection 16 into the cylinder chamber 18, said pressure medium applying pressure on the piston 13 at its underside. The cylinder connection 15 is thereby connected with the atmosphere or with the reverse flow. Upon upstroke of the piston 13 the lifting mechanism 20 is raised via the rod extension 19. Hereby the slide valve 38 is carried along by the lifting mechanism 20 via the stop 46, 48 (FIG. 3) or the stop 50 (FIG. 1). At the beginning of the upstroke of the piston 13 the closing member 25 arranged at the lower end of the lifting mechanism 20 raises itself with its seat from the valve seat 29 whereby the link to the sludge drain 4 is established at atmospheric pressure. Upon upstroke of the lifting mechanism 20 the radial bore 56 is shut off via the flange 42 of the slide valve upper section 40 and so, too, the link between the flush-back duct 52 and the sludge drain 4 closed. On the contrary the other radial bore 57 to the other flush-back duct 53 is open, with the result that this flush-back duct 53 is in connection with the sludge drain 4 via the axial duct 58 of the lifting mechanism 20 and the bores 26 and 27. This position of the slide valve 38 in relation to the lifting mechanism 20 is maintained via the entire upstroke of the slide valve into the vicinity of the upper lid section 31 of the support cage 9. The arcuate aperture 55 passes over the slot-type windows 34 of both groups I and II in succession. Upon upstroke of the slide valve 38 the slit aperture 35 overlaps thereby first of all the lower window 34 of the window group I, whereas the slit aperture 55 on the arcuate region of the windows 34 of the adjacent group II moves over the web 35 located here. This means that upon upstroke of the slide valve 38 the windows 34 of both window groups I and II are not overlapped simultaneously but one after the other by the slit aperture 55 with the result that a backflushing of the filter occurs over only a relatively small surface area. Due to the pressure difference between the filter outlet side 3 and the sludge drain 4 in connection with the atmosphere a small volume of the filtrate found in the filter chamber 10 flows through the respective window 34 intersected by the slit aperture 55, whereby it carries with it the residues deposited in this region to the filter element 30 and flows via the slit aperture 55 into the radial flush-back duct 53 and from here via the radial bore 57 and the lifting mechanism 20 to the sludge drain 4. Via the other flush-back duct 52 on the other hand upon upstroke of the slide valve 38 no backflushing is effected, since the link of this duct via the radial bore 56 to the sludge drain 4 is cut off.

As soon as the slide valve 38 has passed over the uppermost window 34 of the support cage 9 and thus cleared the filter element 30 of deposits in the circumferential region of both window groups I and II, the downstroke of the lifting mechanism 20 and the slide valve 38 commences. Hereby the piston 13 is forced by introduction of the pressure medium into the cylinder chamber 17, whereas the annular cylinder chamber 18 is opened to the atmosphere or the reverse flow. At the beginning of the downstroke of the piston 13 the lifting rod 20 moves relative to the slide valve 38 which is due to its slip position held at the cylindrical inner surface of the support cage 9 by friction contact. Upon this relative movement the radial bore 56 pushes itself under the flange 42, whereby the link of the flush-back duct 52 is opened via the radial bore 56. At the same time the other radial bore 57 pushes itself over the lower flange 41 of the slide valve lower section 39, whereby the radial bore 57 and the link of the flush-back duct 53 with the sludge drain is closed. As soon as the downstroke lifting mechanism 20 comes into contact with the slide valve 38, the slide valve 38 participates in the downstroke of the lifting mechanism, whereby from the slit aperture 54 the windows 34 of both window groups III and IV are passed over consecutively with the result that the filter element 30 is now also cleared of residues over the circumferential area of the window groups III and IV. The flush-back liquid consisting of the filtrate flows via the slit aperture 54, the flush-back duct 52, the radial bore 56 and the bores 58, 26 and 27 into the sludge drain 4.

As soon as the slide valve 38 has reached its lower position, one working cycle of the flush-back operation is concluded. A new working cycle can be initiated when the differential pressure between filter inlet 2 and filter outlet 3 reaches a definite value.

With the aforesaid described flush-back filters the slide valve 38, as mentioned, has two arcuate shaped slit apertures 54 and 55 and correspondingly two flush-back ducts 52 and 53 which extend respectively approximately over an angle of 180°. It would also be possible to provide four such flush-back ducts offset in the rotary slide valve by respectively 90° with separate shut off valves 56, 42, resp. 57, 41 whereby each of these four flush-back ducts passes over a slit aperture 54 of approximately 90° the surface area of only one single window group. In this case the backflushing takes place at each of the four window groups I to IV via an own flush-back duct automatically shutoff or opened depending on the stroke direction of the slide valve in relation to the sludge drain.

Also it would be possible to provide another number of window groups instead of the four window groups at the support cage 9 as long as the slot-type windows 34 of the various window groups as described above are offset in stroke direction of the slide valve 38 against each other, with the result that respectively only a single window is passed over by the slide valve.

Figure 4:
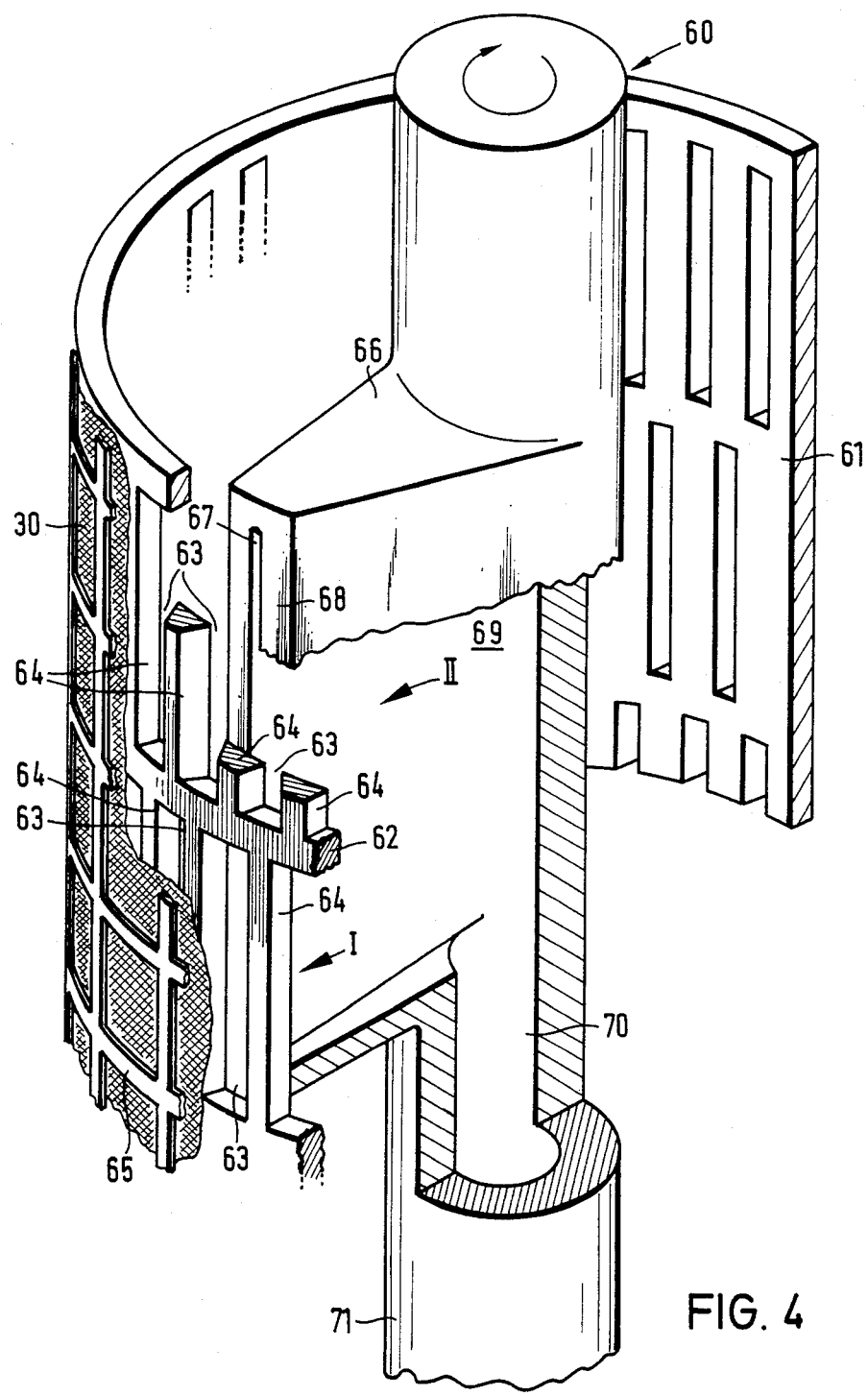
FIG. 4 a second embodiment example of a flush-back device and support cage in perspective partial sectional diagram used in the case of a flush-back filter according to the invention.

In FIG. 4 another embodiment of the flush-back device 60 is depicted. Here the support cage 61 has two window groups I and II which are arranged in axial direction of the support cage over one another and are separated from one another via an annular circumferential web 62. The slot-type windows 63 of both window groups I and II run in this case in axial direction of the support cage 61. The same applies for the webs 64 located between the windows 63. Within each group I and II the windows 63 and the webs 64 are distributed over the entire circumference of the cylindrical support cage 61. It is recognizable that here too the windows 63 and webs 64 of the one group I are offset against those of the other group II and that is to say in circumferential direction of the support cage 61, with the result that respectively the windows 63 of the one group I lie on a common axial plane with the webs 64 of the other group II. The filter element 30 consisting of a filter tissue or the like is located on the exterior of the cylindrical support cage 61 and is e.g. held on the support cage by a lattic-like retaining device 65.

The flush-back device 60 consists of a flushing arm 66 rotatable on its axis in the cylindrical support cage 61 which is provided with an axial running slit aperture 67 which openes out at the cylindrical end face 68 of the flushing arm 66. The flushing arm 66 with the cylindrical end face 68 is in close slip contact with the cylindrical inner surface of the support cage resp. its web sections. The flushing arm 66 has on its interior a flush-back chamber 69 which is connected with the axial duct 70 of a tubular shaft 71, which, similar to the lifting rod 20 in the case of the previous embodiment example, is connected via a shut-off valve with the sludge drain. The slit aperture 67 extends essentially over the entire filter effective length of the support cage 61. It passes over accordingly both the windows of the lower window group I as well as the windows of the upper window group II. During the flush-back operation the flushing arm 66 is rotated around the axis of the support cage 61 with the help of a rotary drive (not shown) which displaces the hollow shaft 71 in rotation, whereby the nozzle type slit orifice 67 passes over the windows 63 of both window groups I and II consecutively and thus, as described above in connection with the embodiment example according to FIGS. 1 to 3, the filter element 30 is flushed free in small surface areas. Instead of only two window groups I and II with the embodiment example according to FIG. 4 even three or more window groups can be provided in axial direction over one another on the support cage 61 whereby the windows of the window groups are offset against each other in circumferential direction.

In the case of the aforesaid described flush-back filters the entire filter area is subdivided into a plurality of small flushing zones whereby an optional flushing effect is achievable with low pressure loss and slight flushing volumes. No costly controls for the flush-back device are necessary.

Changes to the previously described flush-back filters as preferred embodiment examples are possible without leaving the scope of the invention. For example, it would be possible in the case of the flush-back filter according to FIGS. 1 to 3 to use a support cage 9 of conventional construction type, as known from the DE-PS No. 14 36 267. With the unchanged flush-back device 37 backflushing in this case occurs also in both stroke directions, whereby during upstroke of the slide valve 38 respectively two windoes 34 at the same height of two window groups are passed over by backflushing whereas upon downstroke of the slide valve 38 the backflushing occurs over the windows 34 of both other groups simultaneously intersected in pairs. Also it would be possible to determine the number of flush-back ducts arranged in the slide valve 38 and the number of arcuate slit apertures allocated thereto as well as the named shut-off valves equal to the number of window groups so that upon appropriate control of the shutoff valves upon upward and downward stroke of the slide valve 38 respectively only one single window group is passed over during backflushing whereas a backflushing at the other window groups is stopped in the case of the closed position of the appropriate shutoff valves.

Also with the embodiment example according to FIG. 4 at least two slit apertures 67 axially separated from one another could be provided at the flushing ram 66, whereby the one slit aperture is allocated to the lower window group I and the other slit aperture to the upper window group II. The flushing arm 66 has in this case its own flush-back duct for each slit aperture 67 which via an own shutoff valve, expediently likewise arranged on the flushing arm is connectable with the sludge drain or can be cut off from it via this. In this case the shutoff valves would have to be controlled alternately so that in each case the one flushing duct is closed to the sludge drain when the other flushing duct is linked to the sludge drain. The aforesaid described amended embodiment forms are claimed in claims 15 to 18, which are thus attributed independent inventive significance.

We claim:

1. A flush-back filter comprising: a filter housing having an interior filter chamber fluidly communicating with a filter inlet, a filter outlet and a sludge drain, the filter outlet and the sludge drain being at a differential pressure; a cylindrical support cage in the filter chamber separating the fluid outlet from the fluid inlet and the sludge drain; filter means surrounding the exterior of the support cage for filtering liquid media penetrating the support cage from the fluid inlet to the fluid outlet; flush-back means movably disposed interior of the support cage for traversing the inner surface thereof; at least two groups of slots formed in the support cage, the slots of each group being separated by corresponding webs along the interior surface traversed by the flush-back means; the slots of one group lying in the plane of the webs of the other group; channel means formed in the exterior surface of the flush-back means fluidly communicating with the sludge drain and alternately registering with the slots and the webs of each of said groups as the flush-back means traverses the interior surface of the support cage, the arrangement being such that the channel means simultaneously register with a slot of one of the groups and a web of the other of the groups during movement of the flush-back means whereby at any one time liquid media is reversely flushed by said pressure differential from the filter outlet through just one of the slots into said channel means and into the sludge drain with individual slots of the two groups being alternately flushed during the traverse of the flush-back means thereby progressively clearing the interior surface of adhering impurities with small flush-back volumes and with low pressure drops.

2. The flush-back filter as recited in claim 1, wherein the slot means are parallelly spaced with the slot means of each group being relatively circumferentially spaced.

3. The flush-back filter as recited in claim 2, wherein the slot means and the web means extend circumferentially of the support cage and each group comprises a plurality of parallel windows offset against each other in the direction of the longitudinal axis of said support cage and extending over the same partial circumference of said support cage, the flush-back means comprising a slide valve guided closely to the interior surface of the support cage with a stroke movable in the axial direction of said support cage, which slide valve has at its periphery the channel means running in the circumferential direction and connected or connectable with said sludge drain via a tubular lifting rod raisable with said slide valve, one group of the slot means being offset in the axial direction of said support cage against the slot means of the other group in circumferential direction in such a way that said slot means of said one group lie respectively on a common radial plane of said support cage with said web means of said other group.

4. The flush-back filter as recited in claim 3, wherein four window groups are provided offset at respectively 90° against one another over the circumference of said support cage, the windows whereof extending respectively over a circumference of about 75° to 85°, wherein the slot means of diametrically opposed groups lie on common diametrical planes, which are offset against the diametral planes of said slot means of the other group in axial direction of said support cage.

5. The flush-back filter as recited in claim 4, wherein said slide valve has at least two back-flushing ducts offset against each other in circumferential direction and shut-off against each other, the back-flushing ducts being respectively connected at the slide valve circumference with a channel means comprising arcuate slit apertures which are respectively connected with said sludge drain via associated discharge ducts shut-off by a closing member carried by and dependent on the direction of movement of said slide valve, whereby upon up-stroke of said slide valve the one discharge duct is closed by the associated closing member and the other discharge duct opened by its closing member and upon downstroke of said slide valve the first-named discharge duct is opened and the second-named discharge duct is closed by its associated closing member.

6. The flush-back filter as recited in claim 5, wherein said discharge ducts consist of radial bores in the tubular lifting rod and said closing members are formed by slide valve surfaces firmly arranged on said slide valve overlapping the radial bores with said slide valve being axially limitedly movable in relation to said tubular lifting rod for alternate opening and closing of the radial bores dependent on the direction of movement thereof.

7. The flush-back filter as recited in claim 6, wherein pressure operable drive means move the slide valve between said positions.

8. The flush-back filter as recited in claim 7, wherein said slide valve consists of a lower section and an axially spaced upper section, which respectively have a central opening for the passage of said tubular lifting rod as well as openings for the flow of the medium to be filtered, whereby said flush-back ducts are formed by the axial spacing between said sections.

9. The flush-back filter as recited in claim 7, wherein sections of the slide valve are connected by sleeves which form said openings for the flow of the liquid media to be filtered.

10. The flush-back filter as recited in claim 7, wherein said arcuate slit aperture is formed in each section of said slide valve and axially separated from one another.

11. The flush-back filter as recited in claim 8, wherein said radial bores forming said discharge ducts and said flush-back ducts are circumferentially and axially spaced from one another.

12. The flush-back filter as recited in claim 11, wherein said lifting rod bears at its lower end a closing member for opening and closing said sludge drain.

13. The flush-back filter as recited in claim 1, wherein the flush-back means consists of a flushing arm rotatable within the cylindrical support cage, the flushing arm being provided with channel means connected or connectable to said sludge drain, and registering with the slot means upon rotation of the arm and wherein said two groups are relatively circumferentially spaced and respectively distributed about the support cage, and extend in the axial direction thereof and separated by axial web means.

14. The flush-back filter as recited in claim 13, wherein said slot means of the one group lie in a common axial plane with said web means of the other group.

15. The flush-back filter as recited in claim 13, wherein the channel means comprise axially spaced slit apertures which traverse separate sections of the interior surface of the support cage.

16. The flush-back filter as recited in claim 15, wherein the slit apertures are alternately connected to the sump drain by shut-off valve means.

17. The flush-back filter as recited in claim 13, wherein said channel means of said flushing arm is guided in close positioning against the interior surface of said support cage and extends essentially over the entire effective axial length of said support cage.

18. The flush-back filter as recited in claim 17, wherein said flushing arm is arranged on a hollow shaft which is fluidly connected to the sludge drain.

* * * * *